(12) United States Patent
Buchheit et al.

(10) Patent No.: US 9,213,986 B1
(45) Date of Patent: Dec. 15, 2015

(54) MODIFIED MEDIA CONFORMING TO USER-ESTABLISHED LEVELS OF MEDIA CENSORSHIP

(71) Applicants: Brian K. Buchheit, Davie, FL (US); Scott M. Garrett, Weston, FL (US)

(72) Inventors: Brian K. Buchheit, Davie, FL (US); Scott M. Garrett, Weston, FL (US)

( * ) Notice: Subject to any disclaimer, the term of this patent is extended or adjusted under 35 U.S.C. 154(b) by 129 days.

(21) Appl. No.: 14/060,183

(22) Filed: Oct. 22, 2013

Related U.S. Application Data

(63) Continuation-in-part of application No. 13/152,329, filed on Jun. 3, 2011, now abandoned.

(51) Int. Cl.
*H04N 5/85* (2006.01)
*G06Q 30/02* (2012.01)
*G11B 27/036* (2006.01)
*H04N 9/87* (2006.01)

(52) U.S. Cl.
CPC .......... *G06Q 30/0276* (2013.01); *G11B 27/036* (2013.01); *H04N 5/85* (2013.01); *H04N 9/87* (2013.01)

(58) Field of Classification Search
None
See application file for complete search history.

(56) References Cited

U.S. PATENT DOCUMENTS

| | | | | |
|---|---|---|---|---|
| 6,463,207 | B1* | 10/2002 | Abecassis | 386/261 |
| 6,944,585 | B1* | 9/2005 | Pawson | 703/22 |
| 2004/0168121 | A1* | 8/2004 | Matz | 715/513 |
| 2004/0220926 | A1* | 11/2004 | Lamkin et al. | 707/3 |
| 2004/0261099 | A1* | 12/2004 | Durden et al. | 725/32 |
| 2005/0108753 | A1* | 5/2005 | Saidi et al. | 725/46 |
| 2006/0101487 | A1* | 5/2006 | Jarman et al. | 725/34 |
| 2009/0306969 | A1* | 12/2009 | Goud et al. | 704/10 |
| 2010/0251305 | A1* | 9/2010 | Kimble et al. | 725/46 |

\* cited by examiner

*Primary Examiner* — William C Vaughn, Jr.
*Assistant Examiner* — Eileen Adams
(74) *Attorney, Agent, or Firm* — Patents on Demand P.A.; Brian K. Buchheit; Scott M. Garrett

(57) ABSTRACT

User defined controls for media censorship may define values for content of the media for a user. Controls can be specific to nudity in the media, sexuality of the media, language offensiveness of the media, and/or violence in the media. When a user requests a media instance, a default version can be checked for default artifacts that violate the controls. Replacement artifacts can be created for each violating default artifact. Modified media can be created that replaces the default artifacts with the replacement ones. The modified media can be provided to the user in response to the user request.

19 Claims, 3 Drawing Sheets

MODIFIED MEDIA CONFORMING TO USER-ESTABLISHED LEVELS OF MEDIA CENSORSHIP

CROSS REFERENCE TO RELATED APPLICATIONS

This application claims the benefit of Utility application Ser. No. 13/152,329 entitled "Altering Embedded Digital Media content Responsive to User or Provider Customization Selections", filed Jun. 3, 2011, which is herein incorporated by reference in its entirety. Utility application Ser. No. 13/152,329 claims priority to provisional application 61/359,518 filed on Jun. 29, 2010.

BACKGROUND

The field of the invention is the field of digital media, more specifically to modified media conforming to user-established levels of media censorship.

Digital media video and audio, such as movies, contain product placement and are accountable to various levels of consumer ratings (for example, movies can be rated G, PG-13, R, etc., depending on the level of various content such as violence, language, nudity, and the like). Such categories and their corresponding ratings vary internationally and few digital media is released as both "clean" (i.e., G or PG-13) as well as "uncensored" (i.e., rated R) versions. These consumer ratings are utilized globally as guidelines for culturally accepted or suggested behavior and cultural attitude norm towards given subjects covered by the consumer ratings. There currently exists no facilitator to post-production alter media content to quickly switch from one level of consumer rating to another.

With regard to the product placement component of media artifacts, a disadvantage lies in the fact that currently product placement embedded within the digital media artifact (for example, a character holding a can of beer) is frozen at time of distribution and cannot be altered post production (for example, the same character holding a can of beer cannot post production be shown holding a can of soda instead should a user or media provider prefer the soda to the beer at any given point in time post production). Furthermore, product placement is targeted for a general audience for which the artifact is geared towards, rather than for specific individuals or consumers.

SUMMARY

The disclosure presents a solution for manipulating digital content based on user or provider customization selections. Enabling customization of embedded digital content and manipulation of product placement post production has key advantages: Among these advantages is that the disclosed solution allows providers to capitalize on further marketing financing, gives users the opportunity to receive targeted product placement that is tailored to their individual preferences, and provides a means of efficiently and appropriately adapting media artifacts in accordance with various desired consumer rating levels.

For example, in accordance with one embodiment of the disclosure, incorporating parental controls may allow for a quick and user friendly way of switching between a version of a specific movie that is rated R to a PG-13 version of the particular movie in question by utilizing the system to alter the audio and/or video stream accordingly. In another embodiment, the media provider may select to manipulate the digital media artifact to utilize embedded product placement for user specific targeted marketing rather than being confined to tailor marketing with embedded product placement for a general target audience profile.

DETAILED DESCRIPTION

Figure 1:
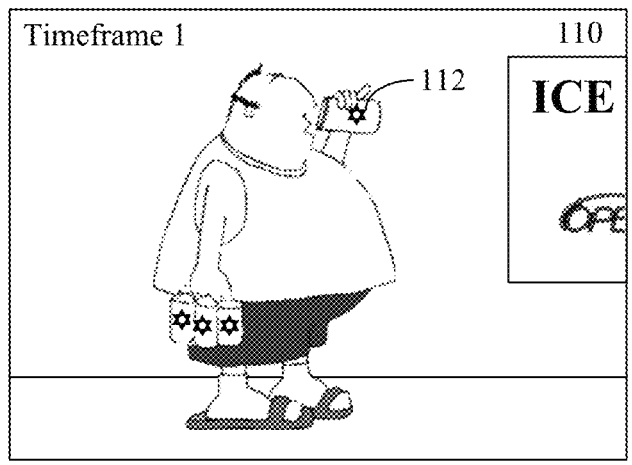
FIG. 1 shows a representation video media having altered video and/or audio components for items depicted in the video media, in accordance with an embodiment of the disclosure.
Figure 1:
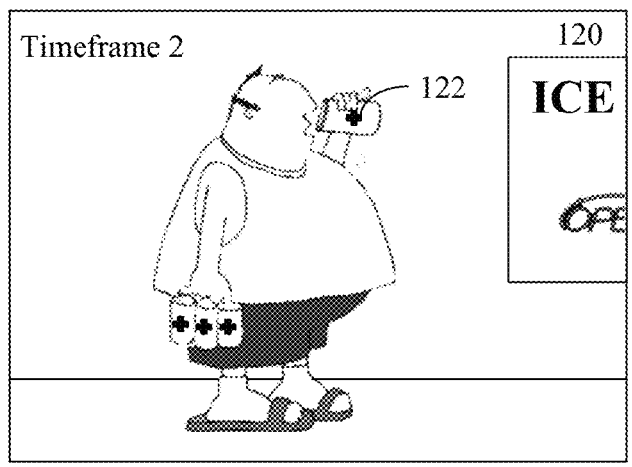

The disclosure recognizes that different user audiences of media react to sensitive situations differently. For example, one audience may find a certain sexual situation offensive, while another will find the same content non-offensive and entertaining. Factors for determining appropriateness of media include viewer age, cultural norms, time-based norms, personal preferences, and religion beliefs. For example, derogative ethnic-based language included in media produced one hundred years ago, which was acceptable by the standards of that age, may be unacceptable by more modern standards.

Despite a wide range of perspectives on content appropriateness, a "one-sized-fits-all" approach is often taken for consumable media. For example, the Motion Picture Association of America establishes guidelines like "G", "PG', "PG-13", "R", and the like for movies. This may or may not be a valid guide for a specific viewer. For example, a conservative parent may not find excessive drinking or sexual innuendo un-suitable for their teenage child, yet a movie may be rated PG. The present disclosure permits end-users to control media ratings at a relatively low level of granularity, and to even modify media content to suit their personal censorship preferences.

For example, a user specific set of preferences can be established for media. These preferences can establish a set of user defined controls for media censorship. The controls may define content of the media. A violence control, a nudity control, a sexuality control, and an offensive language control may be included. Each control can permit a user to establish censorship values for future media. The values may specify a level (high-medium-low), a specific type of censorship, or an enumerated list of what is acceptable and what is not for any censorship category.

When a user requests media, after the controls are established, the media can be checked or analyzed. During this process, a default version of a media instance can be examined for default artifacts (those present in the default version) that violate one or more of the user controls. For example, a scene where nudity violates a nudity control can be detected and flagged as a default artifact in violation of a censorship control. A set of replacement artifacts can be determined for the default artifacts, where the replacement artifacts do not violate any of the censorship controls. A replacement artifact for a "nudity" violating one, may use digital signal processing (DSP) techniques to generate clothes over an otherwise exposed body part of a video. In another, less sophisticated embodiment, a region may be obscured via an overlay or substitution region so an exposed and offensive (to the nudity control) body part is not viewable. A modified version of the media instance is created, where the replacement artifacts have been substituted for the default artifacts in violation of the censorship controls. This modified version can be provided to the requesting user in response to the request.

The innovation described herein works with a variety of different media types, which include video, audio, and text based media. The substitutions may "sanitize" the media so that it satisfies more stringent censorship standards, which are defined by a specific user. Conversely, one type of user may utilize the disclosure's techniques to produce a modified version of a media instance having more lax censorship standards. The modified media may have a level of "censored content" per user specific customizations, which no production version of the media instance has. Thus, a modified version of a television show can be "cleaner" than an aired (production version). Similarly, a modified version of a movie may be (if the censorship controls incited that the user's preferences are for especially profane language in his/her movies) "less clean" than any production version. As an example of a "less clean" adjustment, if an end-user wanted "Mary Poppins" to talk in language that would make a drunken sailor blush (a high level of profanity), settings can be adjusted so that the modified version of the media instance will be delivered to the end-user to suit this desire.

The present innovation can be implemented for a specific device (DVD, BLURAY player, television, computer), for a specific media platform (AMAZON MOVIES, NETFLIX, GOOGLE PLAY, etc.), or for any media provided to a specific-end user. Advertisements may be selected (or adjusted) to conform to the user defined censorship settings in one embodiment. Further, these settings may even be conveyed to advertisers to help target direct marketing campaigns based on a user's censorship preferences (which may be indicative of type of products that are best targeted for that individual).

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) where the software embodiment can include a storage medium (which can be a tangible, physical, non-transitory storage medium) within which the software resides, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer program stored on a computer readable storage medium may be propagated over a distance via a computer readable signal medium.

The computer readable storage medium can be a tangible, non-transitory medium. The computer readable storage medium can be a physical device or part of a physical device in which information is digitally encoded. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable, programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a representation video media 100 having altered video and/or audio components for items depicted in the video media, in accordance with an embodiment of the disclosure. Timeframe A 110 depicts a frame of a digital media artifact. Item 112 can be an example of the selected embedded product placement object that can be altered based on provider or user preference selections. In the original post production video file, item 112, can for example, be a can of a particular type of beer a character in the video is consuming. Timeframe B 120 illustrates the changed embedded item 112 to item 122.

While item 112 from timeframe A 110, which can be the original post production digital media artifact, can represent a can of a particular brand of beer, in timeframe B 112, item 112 can be replaced with item 122 that can, for example, be another brand of beer. This selection may be in accordance with a change in partner vendors or sponsors or a user preference of microbrews or domestic brews. In another embodiment of the disclosure, item 122 can be a can of soda instead of the item 112 can of beer, which can be the result of a user enabling parental controls for the disclosed system.

The change of item 112 in timeframe A 110 to item 122 in timeframe B 120 can be done via a multitude of ways. One such way can be to utilize blue screening or chroma key compositing (i.e., utilize a visual overlay with geospatial and time sequencing to identify what geometric space to modify based on the selection made by users or providers). More specifically chroma keying is a technique for compositing two images or frames together in which a color (or a small color range) from one image is removed (or made transparent), revealing another image behind it. Moreover, smoothing algorithms for voices and times can be applied so that the resulting composition of frames can seem unaltered from the original.

Figure 2:
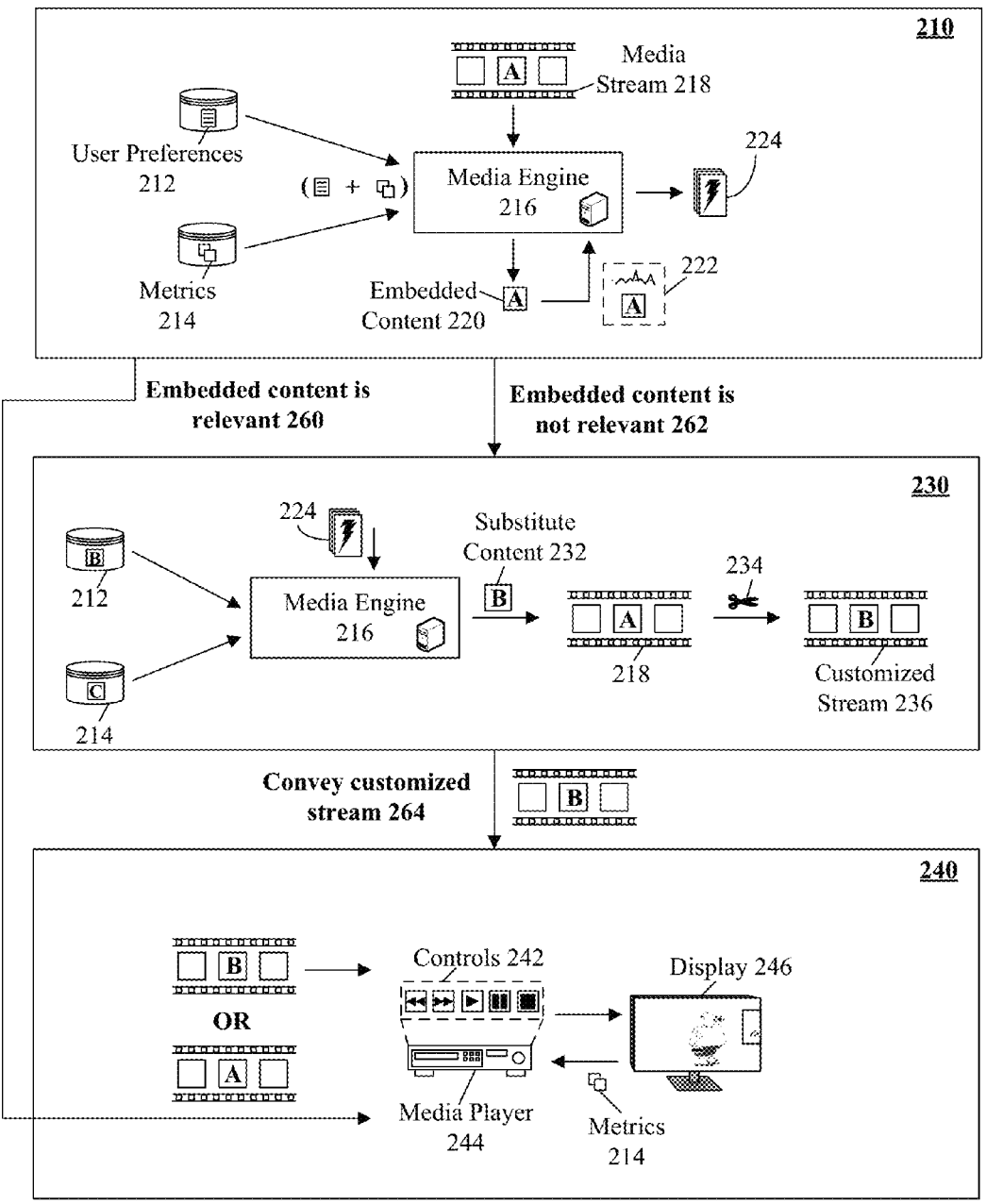
FIG. 2 shows a representative diagram for manipulating digital content based on user or provider customization selections in accordance with an embodiment of the disclosure.

FIG. 2 shows a representative flow diagram 200 for manipulating digital content based on user or provider customization selections in accordance with an embodiment of the disclosure. Flow diagram 200 can be present in the context of system 300. In flow diagram 200, a media stream 218 can be analyzed to determine embedded content 220 which can be dynamically replaced based on customization parameters. For example, during playback, embedded content 220 can be replaced with a substitute content 232. That is, stream 218 can be altered after post production of the stream occurs to target specific viewer preferences. Embedded content 220 can include, but is not limited to, a frame, a series of frames, a region within one or more frames, and the like. For example, content 220 can be an automobile within a scene of a movie which can be replaced to create a post-production advertising revenue stream.

As used herein, a media stream 218 can be a digital artifact associated with a video and/or an audio stream. Media stream 218 can be associated with a digital cinematography process, a filmmaking process, and the like. Stream 218 can conform to a post production artifact such as a self-contained file digitally encoded with an electronic storage medium (e.g., MPEG4 file). Post production can include, but is not limited to, a video editing process, soundtrack manipulation (e.g., writing, recording, editing) process, special effect, media transfer, and the like.

It should be appreciated that the disclosure can allow real-time dynamic alteration of a media stream 218 during stream 218 playback. For example, diagram 200 can be associated with a video on demand system. Flow diagram 200 can illustrate a series of stages 210-240 associated with the present invention. It should be understood that stages 210-240 can be executed out of order, in serial, and in parallel. For example, condition 260 can permit stage 240 to be executed before stage 230. Additionally, the flow diagram 200 can be continuously performed during playback allowing real-time content substitution. Further, it should be appreciated that flow diagram 200 exemplifies one embodiment for achieving digital content manipulation based on user or provider customization selections during playback. Other embodiments are contemplated herein.

In stage 210, user preferences 212 and/or metrics 214 can be collected from one or more data sources. Data sources can include, but is not limited to, content provider data sources, user associated data sources, and the like. For example, a computing device hard drive utilized by a user can be analyzed to determine user preferences. User preferences 212 can include, but is not limited to, viewing behaviors, browsing history, purchasing habits, and the like. For example, a user's Internet browsing history can be evaluated to determine a user's favorite Web site. Metrics 214 can include, but is not limited to, behavior metrics, usage metrics, and the like. For example, metrics 214 can include the number of times a user skips through content 220 within stream 218.

Preferences 212 and/or metrics 214 can be analyzed utilizing traditional and/or proprietary techniques. Techniques can include, pattern identification, predictive capabilities, and the like. For example, engine 216 can examine preferences to determine a user is likely to prefer a commercial advertising a grape flavored soda rather than an orange flavored soda. Preferences 212 and/or metrics 214 can be collectively analyzed or independently examined.

In one instance, engine 218 can analyze stream 218 to determine embedded content 220. In the instance, engine 218 can evaluate content 220 against one or more user preferences 212 and/or metrics 214. For example, engine 218 can determine if content 220 is relevant to a user (e.g., viewer) via examination 222. In one embodiment, result 224 can be generated from engine 216 which can drive substitute content selection. In one configuration of the embodiment, result 224 can include metadata which can assist in determining when content 220 is relevant to a user. For example, result 224 can include keyword tags which can drive substitute content searches.

When content 220 is relevant to a user, stage 230 can be optionally omitted and stage 240 can be performed. When condition 262 is met and embedded content 220 is not relevant to a user, stage 230 can be executed.

In stage 230, substitute content from a primary content provider 212 and/or a secondary content provider 214 can be obtained. Primary content provider 212 can include a content provider associated with distributing and/or owning media stream 218. Secondary content provider 214 can include a content provider not directly associated with media stream 218 and/or primary content provider 212. Provider 212-214 can stored identical substitute content and/or different substitute content. Provider 212, 214 can be associated with a digital asset management component, content management capability and the like.

Engine 216 can utilize result 224 to obtain relevant substitute content 232 within stage 230. Substitute content 232 can be obtained in one or more traditional and/or proprietary fashions. Content 232 can differ from content 220 in one or more ways and can be manipulated via action 234 to seamlessly appear within customized stream 236. For example, action 234 can resize content 232 to match embedded content 220 within stream 218. In one instance, action 234 can produce a new artifact such as customized stream 236. In the instance, stream 236 can be conveyed to a playback device (e.g., media player 244) in a traditional manner.

In one configuration of stage 240, customized stream 236 can be conveyed to media player 244. In the configuration, altered stream 236, including substitute content 232, can be presented within display 246. In another configuration of stage 240, media stream 218 can be conveyed to media player 244. In the configuration, unaltered stream 218, including embedded content 220, can be presented within display 246. In both configurations of stage 240, metrics 214 can be collected based on usage and/or viewing behavior. For example, controls 242 metrics can be collected to determine viewing habits.

Drawings presented herein are for illustrative purposes only and should not be construed to limit the invention in any regard. It should be appreciated that flow diagram is not limited to the configurations described herein and can be extended to any implementation allowing the presentation of a media stream having detectable embedded content. It should be understood that embedded content 220 and/or substitute content 232 can be identified manually and/or automatically.

Figure 3:
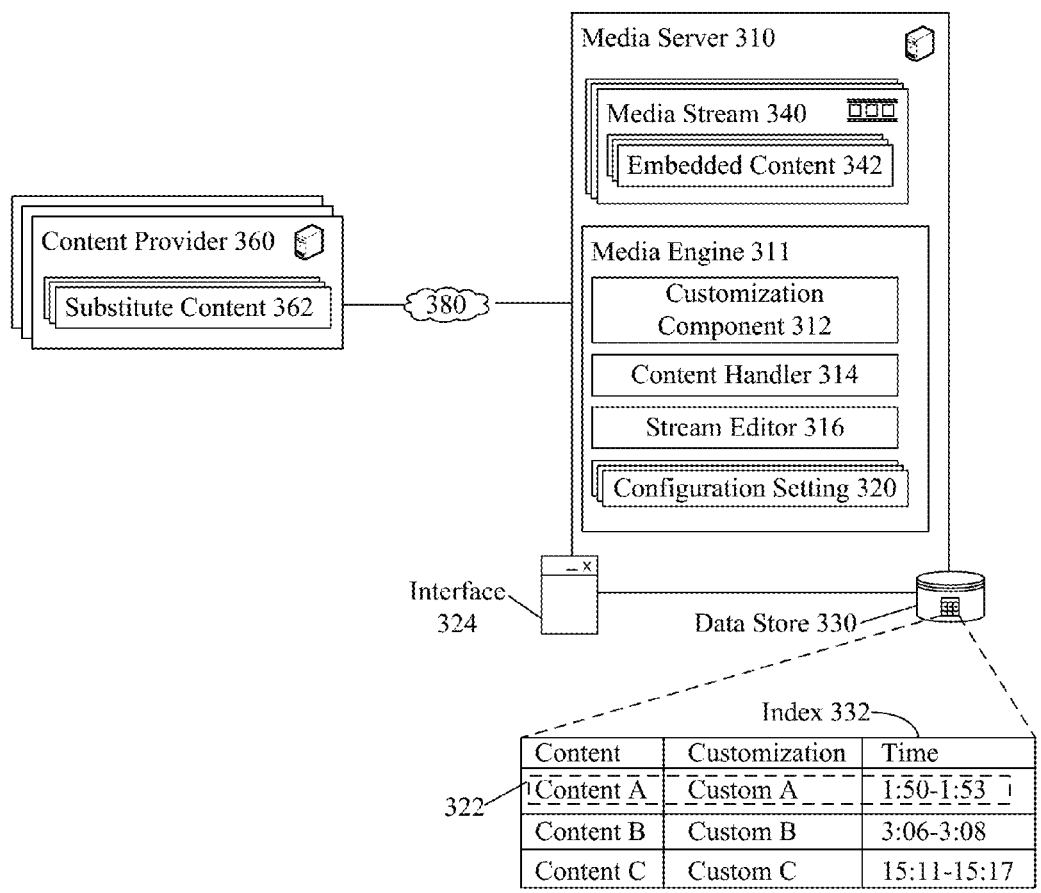
FIG. 3 shows a representative diagram illustrating a system for manipulating digital content based on user or provider customization selections in accordance with an embodiment of the disclosure.

FIG. 3 shows a representative diagram illustrating a system 300 for manipulating digital content based on user or provider customization selections in accordance with an embodiment of the disclosure. System 300 can be present in the context of diagram 100 and/or flow diagram 200. System 300 describes one embodiment for dynamically customizing a media stream based on user or provider content selections. That is, one or more customizations to stream 340 can be performed in real-time, based on a user preference and/or a provider choosing. It should be appreciated that system 300 can be associated with a content delivery platform. System 300 components can be communicatively linked via network 380. It should be noted additional components (not shown) associated with system 300 can be communicatively linked to the system.

System 300 can be utilized to create an advertising market for post-production advertising which can allow advertisers to dynamically change content 342. System 300 can be associated with components which enable monetization of content 362 substitution. For example, an automated bidding system can be communicatively linked to allow advertisers to bid and win advertising product placement within stream 340. That is, system 300 can permit direct marketing based on user lifestyle, behaviors, preferences, and the like. Further, system 300 can allow advertisers to update historic content 340 to reflect current trends and/or advertising preferences. For example, system 300 can permit an outdated logo to be replaced with a current logo in use. Additionally, system 300 can be associated with parental controls allowing intelligent audience aware of such advertising.

Media server 310 can be a hardware/software component for providing access to media stream 340 and/or substitute content 362. Server 310 can include, but is not limited to, media stream 340, media engine 311, interface 324, data store 330, and the like. Server 310 functionality can include traditional and/or proprietary capabilities. Functionality can include, but is not limited to, media storage, media conveyance, media manipulation, media encoding/decoding, and the like. Media server 310 can include, but is not limited to, specialized computer appliance, media application software, a personal computer, and the like.

Media stream 340 can include a streaming media continuously received and presented to a media playback device while being delivered by a content provider. Media stream 340 can include embedded content 342, metadata, and the like. Media stream 340 can conform to traditional and/or proprietary formats including, but not limited to, MOTION PICTURE EXPERT GROUP 4 (MPEG4), AUDIO VIDEO INTERLEAVE (AVI), ADOBE FLASH VIDEO, MICROSOFT ADVANCED SYSTEMS FORMAT (ASF), MATROSKA (MKV), QUICKTIME FILE FORMAT, REALMEDIA, and the like. It should be appreciated that stream 340 can be associated with a digital rights management access technology component, including, but not limited to, ADVANCED ACCESS CONTENT SYSTEM (AACS), PROTECTED MEDIA PATH, watermarks, personally identifiable metadata, and the like.

Embedded content 342 can be a portion of a media stream 340 which can be manipulated during playback. Content 342 can be identified using traditional and/or proprietary mechanisms. Content 342 identification can include, time/position markers, geometric region information, data ranges, and the like. Content 342 can be associated with a product, a service, a user rating, a parental control, and the like. In one instance, content 342 can be determined during playback. In the instance, media engine 311 can select content 342 which can be automatically replaced with substitute content 362. In one embodiment, content 342 can be denoted during a post production process.

Media engine 311 can be a hardware/software component for dynamically altering content 342 during playback based on established preferences. Engine 311 can include, but is not limited to, customization component 312, content handler 314, stream editor 316, configuration setting 320, and the like. Engine 311 functionality can include, but is not limited to, content 342 identification, content 362 retrieval, metric collection, and the like. In one instance, engine 311 can be a network element within a networked computing environment. In one embodiment, engine 311 can be a component of a media player. For example, engine 311 can be a firmware application within a set-top box. In another embodiment, engine 311 can be a component of a home media server.

Customization component 312 can be a hardware/software element able to establish preferences associated with customization of stream 340. Component 312 functionality can include, but is not limited to, preference determination, metrics analysis, content 342 evaluation, and the like. Component 312 can utilize traditional and/or proprietary preference determination procedures. In one embodiment, component 312 can utilize social network information to determine a user likes and dislikes. Component 312 can aggregate user preferences from multiple sources including, but not limited to, computing device preference data, service preference data, and the like. For instance, component 312 can analyze location data within a user's mobile phone to determine a favorite restaurant.

Content handler 314 can be a hardware/software component for managing stream 340, content 342, and/or content 362. Handler 314 functionality can include, but is not limited to, content tracking, substitute content 362 determination, provider 360 communication, content conversion, and the like. In one embodiment, handler 314 can utilize index 332 to track content substitution within stream 340. In the embodiment, handler 314 can dynamically update index during playback as content 342 is replaced with content 362. For example, entry 322 can be used to manage customization (e.g., Custom A) of Content A media stream during a four second time frame (e.g., 1:50-153).

Stream editor 316 can be a hardware/software entity for manipulating stream 340, content 342, and/or content 362. Editor 316 functionality can include, but is not limited to, rendering, filtering, compositing, scaling, audio/video synchronization, and the like. Editor 316 utilize index 316 to determine customizations (e.g., Custom A) which can be performed to replace content 342 with content 362. For instance, editor 316 can utilize index to dynamically adjust stream 340 censorship rating by censoring content 342 with content 362.

Configuration setting 320 can be one or more parameters for establishing the behavior of system 300. Setting 320 can include, but is not limited to, component 312 options, handler 314 settings, editor 316 options, index configuration options, interface setting parameters, provider 360 settings, user preferences, user established settings, and the like. Setting 320 can be used to limit content 362 replacement, restrict content 342 selection, and the like. Setting 320 can be stored with engine 311, data store 330, and the like.

Index 332 can be a data set utilized to track customizations within stream 340. Customizations can include, but is not limited to, visual customizations, audible customizations, synchronization settings, parental control settings, and the like. Index 332 can be stored within data store 330, engine 311, server 310, and/or content provider 360. In one instance, index 332 can include, but is not limited to, a embedded content 342 identifier, a substitute content 362 identifier, a customization setting, a timing value, a stream metadata, a content 342, 362 metadata, and the like.

Interface 324 can be a hardware/software element for interacting with media server 310 and/or media engine 311. Interface 324 functionality can include, but is not limited to, stream 340 presentation, engine 311 configuration management, server 310 controls, playback manipulation, and the like. In one instance, interface 324 can be a Web browser including, but not limited to, MOZILLA FIREFOX, APPLE SAFARI, KONQUEROR, GOOGLE CHROME, MICROSOFT INTERNET EXPLORER, and the like. Interface 324 can include, but is not limited to, a graphical user interface, voice user interface, mixed-mode interface, text-based interface, and the like.

Data store 330 can be a hardware/software component able to store index 332. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms.

Content provider 360 can be a hardware/software entity able to provide access to substitute content 362. Provider 360 can be, but is not limited to, a content delivery network, a content delivery platform, an audio and video on demand (AVOD) system, and the like. Provider 360 can include, substitute content 362, content 362 metadata, user credentials, and the like. For example, a paid version of content 362 can be provided to paying users while a free version of content 362 can be provided to non-paying users.

Substitute content 362 can be a digital artifact able to be presented within stream 340. Content 362 can conform to traditional and/or proprietary formats. Content 362 can be associated with a product, a service, a user rating, a parental control, and the like. Substitute content 362 can include, but is not limited to, an image, an audio stream, a video stream, an audio/video stream, and the like. Content 362 can be special effects including, but is not limited to, a pre-rendered computer generated imagery (CGI), real-time rendered CGI, and the like. It should be understood that substitute content 362 can be utilized to censor and/or un-censor embedded content 342 within stream 340. In one embodiment, content 362 can be interactive content allowing a user to interact with advertising content relevant to the user.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 280 topologies can include, but is not limited to, bus, star, mesh, and the like. Network 280 types can include, but is not limited to, Local Area Network (LAN), Wide Area Network (WAN), Virtual Private Network (VPN) and the like.

Drawings presented herein are for illustrative purposes only and should not be construed to limit the invention in any regard. System 300 can be utilized to modify streams including, but not limited to, audio, video, audio/video, and the like. For example, system 300 can be utilized to replace a soundtrack of a movie with a soundtrack from a user's favorite music album. System 300 can be a distributed computing system, networked computing environment, and the like. In one embodiment, system 300 can be a functionality of an Application Programming Interface (API). In another embodiment, system 300 can be a Web-based service associated with a content delivery service. In yet another embodiment, system 300 can be a plug-in functionality of a media player. For example, media engine 311 can be a Web browser plug-in able to transparently modify a pay-per-view content (e.g., content 342) during playback. It should be appreciated that one or more components within system 300 can be optionally omitted providing system 300 functionality is maintained.

System 300 can be associated with one or more communication protocols including, but not limited to, Transmission Control Protocol (TCP), Internet Protocol (IP), User datagram Protocol (UDP), Real-time Streaming Protocol (RTSP), Real-time Transport Protocol (RTP), and the like. It should be appreciated that system 300 can operate in real-time during playback and/or prior to playback.

What is claimed is:

1. A method comprising:
    storing on a non-transitory storage medium a user-specific set of preferences for media, said user-specific set of media preferences comprising a plurality of user defined controls for media censorship, each of the user defined controls being a defined value for content of the media, wherein the user defined controls enumerate a user specified set of types of nudity to be excluded for media provided to the user, wherein in the user defined controls the user explicitly specifies each of a set of types of nudity, which include different settings by gender, age, and body region;
    responsive to a user request from a user to play a media instance, a computing device detecting a default version of the media instance, wherein said default version fails to conform to the user-specific set of media preferences for the user in that the default version violates at least one value of the user defined controls for media censorship;

the computing device detecting within the default version a set of default artifacts that fail to conform to the user defined controls;

the computing device determining a set of replacement artifacts for the default artifacts, wherein the replacement artifacts conform to the user defined controls, wherein each default artifact and each replacement artifact is an audio or video artifact of the media instance;

the computing device creating a modified version of the media instance, wherein in the modified version the set of replacement artifacts has replaced the set of default artifacts; and the computing device providing the modified version of the media instance to a device of the user responsive to the user request.

2. The method of claim 1, wherein the user defined controls enumerate a user specified set of violent actions to be excluded for media provided to the user, wherein in the user defined controls the user explicitly specifies each of the violent actions to be excluded and is able to select whether each of a plurality of different types of violent action is excluded or included per the user defined controls.

3. The method of claim 1, wherein the user defined controls establish a limit on nudity, wherein the default artifacts comprise images exceeding the limit on nudity, wherein the replacement artifacts comprise images substituting or obscuring images of the default artifacts, wherein the substitute or obscuring images do not exceed the limit on nudity.

4. The method of claim 1, wherein the user defined controls establish a limit on sexuality, wherein the default artifacts comprise images or language exceeding the limit on sexuality, wherein the replacement artifacts comprise images or language substituting for the default artifacts, wherein the images or language of the replacement artifacts do not exceed the limit on sexuality.

5. The method of claim 1, wherein the user defined controls enumerate a user specified set of types of sexuality to be excluded for media provided to the user, wherein in the user defined controls the user explicitly specifies each of a set of types of sexuality, which include different settings for same-sex sexuality, pre-adult sexuality, and violence in sexual situations.

6. The method of claim 1, wherein the modified version of the media instance has a censorship level greater than the default version.

7. The method of claim 1, wherein the modified version of the media instance has a censorship level less than the default version.

8. The method of claim 1, wherein the media instance is a video.

9. The method of claim 1, wherein the media instance is a song, an audio book, or a sound production.

10. The method of claim 1, wherein the media instance is a textual document or e-book.

11. A method comprising:

storing on a non-transitory storage medium a user-specific set of preferences for media, said user-specific set of media preferences comprising a plurality of user defined controls for media censorship, each of the user defined controls being a defined value for content of the media, wherein the user defined controls enumerate a user specified set of types of sexuality to be excluded for media provided to the user, wherein in the user defined controls the user explicitly specifies each of a set of types of sexuality, which include different settings for same-sex sexuality, pre-adult sexuality, and violence in sexual situations;

responsive to a user request from a user to play a media instance, a computing device detecting a default version of the media instance, wherein said default version fails to conform to the user-specific set of media preferences for the user in that the default version violates at least one value of the user defined controls for media censorship;

the computing device detecting within the default version a set of default artifacts that fail to conform to the user defined controls;

the computing device determining a set of replacement artifacts for the default artifacts, wherein the replacement artifacts conform to the user defined controls, wherein each default artifact and each replacement artifact is an audio or video artifact of the media instance;

the computing device creating a modified version of the media instance, wherein in the modified version the set of replacement artifacts has replaced the set of default artifacts; and the computing device providing the modified version of the media instance to a device of the user responsive to the user request.

12. The method of claim 11, wherein the user defined controls establish a limit on violence, wherein the default artifacts comprise actions exceeding the limit on violence, wherein the replacement artifacts utilize substitute or obscuring actions for that of the default artifacts, wherein the substitute or obscuring actions do not exceed the limit on violence.

13. The method of claim 11, wherein the user defined controls enumerate a user specified set of violent actions to be excluded for media provided to the user, wherein in the user defined controls the user explicitly specifies each of the violent actions to be excluded and is able to select whether each of a plurality of different types of violent action is excluded or included per the user defined controls.

14. The method of claim 11, wherein the user defined controls establish a limit on nudity, wherein the default artifacts comprise images exceeding the limit on nudity, wherein the replacement artifacts comprise images substituting or obscuring images of the default artifacts, wherein the substitute or obscuring images do not exceed the limit on nudity.

15. The method of claim 11, wherein the modified version of the media instance has a censorship level greater than the default version.

16. The method of claim 11, wherein the modified version of the media instance has a censorship level less than the default version.

17. The method of claim 11, wherein the media instance is a video.

18. The method of claim 11, wherein the media instance is a song, an audio book, or a sound production.

19. The method of claim 11, wherein the media instance is a textual document or e-book.

* * * * *